(12) United States Patent
Alexander et al.

(10) Patent No.: US 8,701,405 B2
(45) Date of Patent: *Apr. 22, 2014

(54) METHOD OF STARTING A HEAT ENGINE

(75) Inventors: Paul W. Alexander, Ypsilanti, MI (US); Alan L. Browne, Grosse Pointe, MI (US); Nancy L. Johnson, Northville, MI (US); Patrick B. Usoro, Troy, MI (US); Nilesh D. Mankame, Ann Arbor, MI (US); Xiujie Gao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 544 days.

This patent is subject to a terminal disclaimer.

(21) Appl. No.: 12/947,924

(22) Filed: Nov. 17, 2010

(65) Prior Publication Data
US 2011/0120117 A1 May 26, 2011

Related U.S. Application Data

(60) Provisional application No. 61/263,180, filed on Nov. 20, 2009.

(51) Int. Cl.
*F01B 29/10* (2006.01)

(52) U.S. Cl.
USPC .......................................................... 60/527

(58) Field of Classification Search
USPC .................................................. 60/527–529
See application file for complete search history.

(56) References Cited

U.S. PATENT DOCUMENTS

| | | | | |
|---|---|---|---|---|
| 3,665,705 A | * | 5/1972 | Christensen | 60/527 |
| 3,772,876 A | * | 11/1973 | Slysh | 60/529 |
| 3,989,417 A | * | 11/1976 | Neidigh | 417/379 |
| 4,027,479 A | * | 6/1977 | Cory | 60/527 |
| 4,055,955 A | | 11/1977 | Johnson | |
| 4,086,769 A | * | 5/1978 | Smith | 60/527 |
| 4,150,544 A | | 4/1979 | Pachter | |
| 4,275,561 A | * | 6/1981 | Wang | 60/527 |
| 4,302,938 A | * | 12/1981 | Li | 60/527 |
| 4,325,217 A | * | 4/1982 | Golestaneh | 60/527 |
| 4,423,596 A | * | 1/1984 | Karnes et al. | 60/527 |
| 4,887,430 A | * | 12/1989 | Kroll et al. | 60/527 |
| 5,127,228 A | * | 7/1992 | Swenson | 60/527 |
| 5,327,987 A | | 7/1994 | Abdelmalek | |
| 6,226,992 B1 | * | 5/2001 | Kutlucinar et al. | 60/528 |
| 6,647,725 B1 | * | 11/2003 | Letovsky | 60/641.6 |
| 7,775,042 B1 | * | 8/2010 | Tice | 60/529 |
| 2007/0289301 A1 | * | 12/2007 | Taya et al. | 60/527 |
| 2011/0308245 A1 | * | 12/2011 | Tice | 60/531 |

FOREIGN PATENT DOCUMENTS

JP 6080031 A 3/1994

* cited by examiner

*Primary Examiner* — Thomas Denion
*Assistant Examiner* — Jessica Kebea
(74) *Attorney, Agent, or Firm* — Quinn Law Group, PLLC

(57) ABSTRACT

A method of starting a heat engine includes exposing an element of the heat engine to a source of thermal energy provided by a temperature difference between a heat source having a first temperature and a heat sink having a second temperature that is lower than the first temperature. The element is formed from a first shape memory alloy having a crystallographic phase changeable between austenite and martensite at a first transformation temperature in response to the temperature difference between the heat source and the heat sink. The method further includes changing the crystallographic phase of the first shape memory alloy to thereby convert thermal energy to mechanical energy, and inducing initial movement of the element in a desired operational direction to thereby start the heat engine.

10 Claims, 5 Drawing Sheets

METHOD OF STARTING A HEAT ENGINE

CROSS-REFERENCE TO RELATED APPLICATIONS

This application claims the benefit of U.S. Provisional Patent Application No. 61/263,180, filed Nov. 20, 2009, which is hereby incorporated by reference in its entirety.

TECHNICAL FIELD

The present disclosure generally relates to a method of starting a heat engine.

BACKGROUND

Thermal energy is a form of energy provided by a temperature difference between objects, regions, and/or fluids. For example, a primary region of a system may have a comparatively higher temperature than that of a secondary region of a system, and thereby provide a source of thermal energy. Further, such thermal energy may be converted to another form of energy, e.g., mechanical energy or electricity.

SUMMARY

A method of starting a heat engine includes exposing an element of the heat engine to a source of thermal energy. The source of thermal energy is provided by a temperature difference between a heat source having a first temperature and a heat sink having a second temperature that is lower than the first temperature. The element is formed from a first shape memory alloy having a crystallographic phase changeable between austenite and martensite at a first transformation temperature in response to the temperature difference between the heat source and the heat sink. The method further includes changing the crystallographic phase of the first shape memory alloy to thereby convert thermal energy to mechanical energy, and inducing initial movement of the element in a desired operational direction to thereby start the heat engine.

In one variation, the element is formed in a continuous loop, and exposing the element to the source of thermal energy includes positioning an isolator from a first position to a second position. The isolator is configured for blocking the element from the heat source and is disposed between the element and the heat source in the first position. The isolator is not disposed between the element and the heat source in the second position. The method further includes alternately changing the crystallographic phase of the first shape memory alloy from martensite to austenite to thereby dimensionally contract the first shape memory alloy at a localized region in response to the heat source, and from austenite to martensite to thereby dimensionally expand the first shape memory alloy at the localized region in response to the heat sink so as to convert thermal energy to mechanical energy. The method also includes inducing initial movement of the element in the desired operational direction by activating a start-up mechanism configured for kick-starting the heat engine to thereby start the heat engine.

In another variation, the method includes positioning the element in insufficient thermal relationship with the heat source for crystallographic phase change of the first shape memory alloy to occur so as to cease movement of the element in the desired operational direction and thereby disable the heat engine.

The method enables efficient start-up of the heat engine. In particular, the method provides kick-start functionality for the heat engine, which may be useful after a period of non-use or after a temporary stall of the heat engine.

The above features and advantages and other features and advantages of the present disclosure are readily apparent from the following detailed description of the best modes for carrying out the disclosure when taken in connection with the accompanying drawings.

DETAILED DESCRIPTION

Figure 1A:
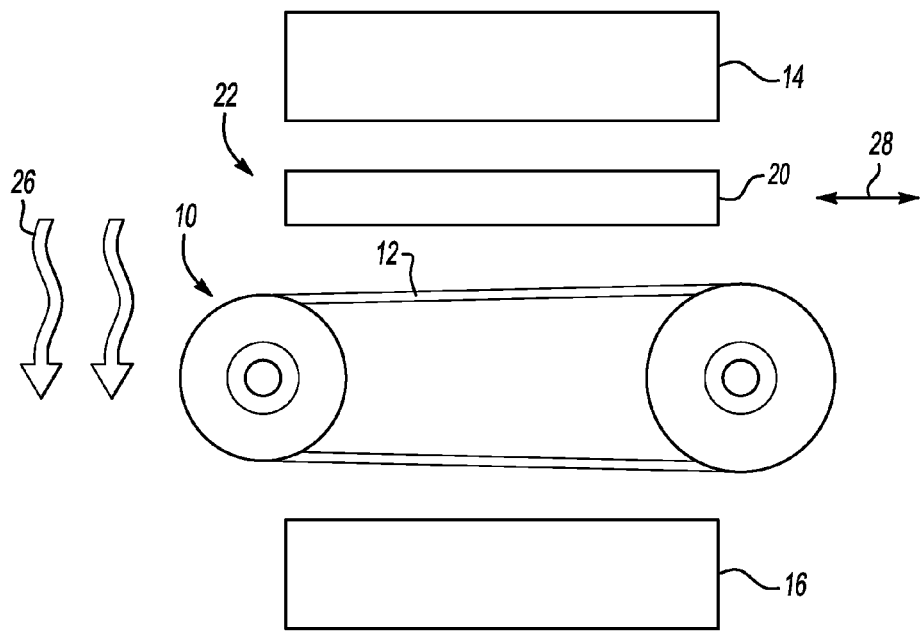
FIG. 1A is a schematic diagram of a heat engine configured for converting thermal energy to mechanical energy, a source of thermal energy, and a start-up mechanism for the heat engine, wherein the start-up mechanism is disposed in a first position.

Referring to the Figures, wherein like reference numerals refer to like elements, a heat engine is shown generally at 10 in FIG. 1. The heat engine 10 is configured for converting thermal energy, e.g., heat, to mechanical energy, as set forth in more detail below. A method of starting the heat engine 10 is disclosed. The method may be useful for automotive applications including, but not limited to, engine cooling systems, vehicle exhaust systems, powertrain systems, and electrical systems. However, the method may also be useful for non-automotive applications, such as, but not limited to, household heating, ventilating, and air conditioning systems.

Figure 1B:
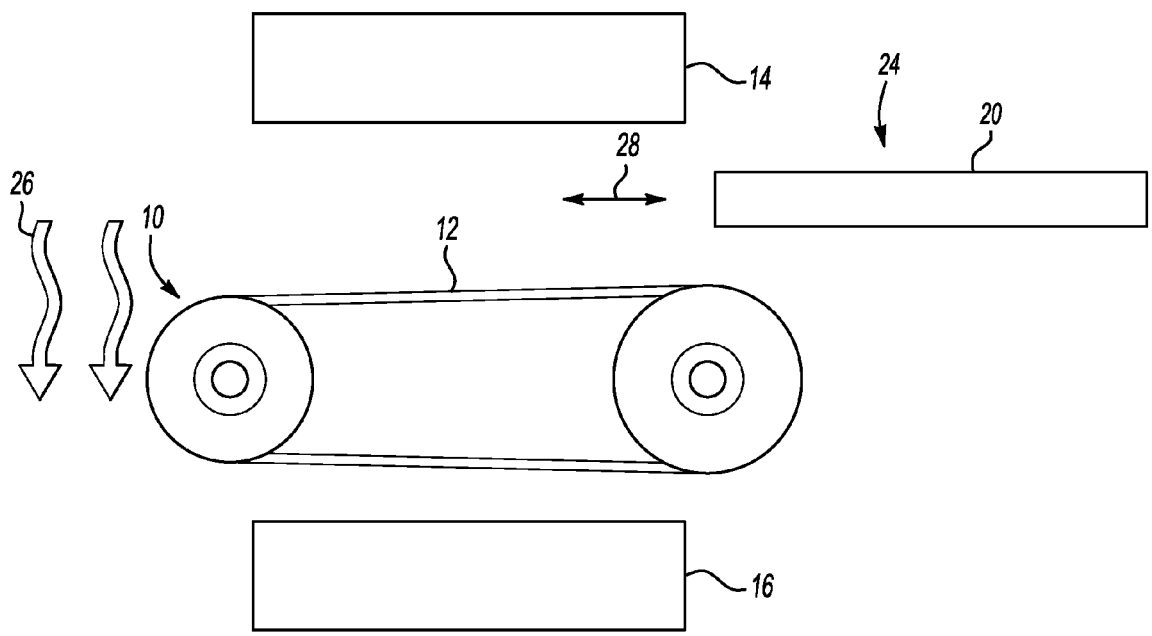
FIG. 1B is a schematic diagram of the heat engine of FIG. 1A, wherein the start-up mechanism is disposed in a second position.

Referring now to FIGS. 1A and 1B, the heat engine 10 may operate in response to a source of thermal energy, as set forth in more detail below. As such, the method includes exposing an element 12 of the heat engine 10 to the source of thermal energy. The source of thermal energy is provided by a temperature difference, $\Delta T$, between a heat source 14 having a first temperature, $T_1$, and a heat sink 16 having a second temperature, $T_2$, that is lower than the first temperature, $T_1$. That is, the first temperature, $T_1$, is higher and different than the second temperature, $T_2$. For example, the temperature difference, $\Delta T$, between the first temperature, $T_1$, and the second temperature, $T_2$, may be as little as about 5° C. and no more than about 100° C. Stated differently, the temperature difference, $\Delta T$, may be greater than or equal to about 5° C. and less than or equal to about 30° C., e.g., less than or equal to about 10° C. As non-limiting examples, although not shown, the temperature difference, $\Delta T$, may exist between or within catalytic converters, battery compartments, transmissions, wheels, brakes, shock absorbers, radiators, heat exchangers, mufflers, turbo/super chargers, plug-in units, and vehicle exteriors. That is, the temperature difference, $\Delta T$, may exist between or within engine lubrication systems, engine coolant systems, battery cooling systems, and the like.

The heat source 14 and the heat sink 16 may each be selected from the group of gases, liquids, solids, and combinations thereof. For example, at least one of the heat source 14 and the heat sink 16 may be a gas, such as a portion of exhaust emissions of the vehicle (not shown) or ambient air in an environment external to the vehicle. Moreover, the heat source 14 may have a different form or phase than the heat sink 16. For example, the heat source 14 may be a gas and the heat sink 16 may be a liquid. Further, the heat source 14 may be the same composition as the heat sink 16, or may be a different composition than the heat sink 16. In one variation, the heat source 14 and the heat sink 16 may each be exhaust gas from a vehicle, but the exhaust gas of the heat source 14 may have the first temperature, $T_1$, that is higher than the second temperature, $T_2$, of the exhaust gas of the heat sink 16. That is, as set forth above, the exhaust gas of the heat sink 16 may be cooler than the exhaust gas of the heat source 14. Or, the heat sink 16 may be an ambient environment external to the vehicle (not shown), such as a relatively cool air flow over the vehicle during vehicle travel.

In another variation described with reference to FIGS. 2A-4, each of the heat source 14 and the heat sink 16 may be a solid, such as a conduit of exhaust gas, piping, rollers, idle pulleys 58, 60 (FIG. 2A), and/or other solid vehicle components, for example. In this variation, as shown in FIGS. 2A-4, the heat source 14 and/or the heat sink 16 may also include a plurality of contacting objects 18 that are configured for conducting heat from the heat source 14 and/or to the heat sink 16, as set forth in more detail below.

Referring again to FIGS. 1A-4, the element 12 of the heat engine 10 is formed from a first shape memory alloy having a crystallographic phase changeable between austenite and martensite at a first transformation temperature, $T_{trans1}$, in response to the temperature difference, $\Delta T$, between the heat source 14 and the heat sink 16. That is, the first shape memory alloy has a specific transformation temperature, $T_{trans1}$, at which the first shape memory alloy transitions between crystallographic phases.

As used herein, the terminology "shape memory alloy" refers to alloys that exhibit a shape memory effect and have the capability to quickly change properties in terms of stiffness, spring rate, and/or form stability. That is, the first shape memory alloy may undergo a solid state crystallographic phase change via molecular or crystalline rearrangement to shift between a martensite phase, i.e., "martensite", and an austenite phase, i.e., "austenite". Stated differently, the first shape memory alloy may undergo a displacive transformation rather than a diffusional transformation to shift between martensite and austenite. A displacive transformation is defined as a structural change that occurs by the coordinated movement of atoms or groups of atoms relative to neighboring atoms or groups of atoms. In general, the martensite phase refers to the comparatively lower-temperature phase and is often more deformable than the comparatively higher-temperature austenite phase.

The temperature at which the first shape memory alloy begins to change from the austenite phase to the martensite phase is known as the martensite start temperature, $M_s$. The temperature at which the first shape memory alloy completes the change from the austenite phase to the martensite phase is known as the martensite finish temperature, $M_f$, or first transformation temperature, $T_{trans1}$. Similarly, as the first shape memory alloy is heated, the temperature at which the first shape memory alloy begins to change from the martensite phase to the austenite phase is known as the austenite start temperature, $A_s$. The temperature at which the first shape memory alloy completes the change from the martensite phase to the austenite phase is known as the austenite finish temperature, $A_f$, or first transformation temperature, $T_{trans1}$.

Therefore, the element 12 formed from the first shape memory alloy may be characterized by a cold state, i.e., when a temperature of the first shape memory alloy is below the martensite finish temperature, $M_f$, or first transformation temperature, $T_{trans1}$, of the first shape memory alloy. Likewise, the element 12 may also be characterized by a hot state, i.e., when the temperature of the first shape memory alloy is above the austenite finish temperature, $A_f$, or first transformation temperature, $T_{trans1}$, of the first shape memory alloy.

Referring again to the method, in one non-limiting variation, exposing the element 12 of the heat engine 10 to the source of thermal energy may include positioning an isolator 20 (FIGS. 1A-2B) configured for blocking the element 12 from the heat source 14 from a first position (shown generally at 22 in FIG. 1A) to a second position (shown generally at 24 in FIG. 1B). The isolator 20 is disposed between the element 12 and the heat source 14 in the first position 22 so as to block the element 12 from the heat source 14, and the isolator 20 is not disposed between the element 12 and the heat source 14 in the second position 24 so as to expose the element 12 to the heat source 14. That is, the isolator 20 may at least partially disrupt heat flow (shown by arrows 26 in FIGS. 1A and 1B) between the heat source 14 and the element 12 when disposed in the first position 22.

The isolator 20 may be any apparatus suitable for at least partially blocking the heat flow 26 from the heat source 14 to the element 12 when disposed in the first position 22 (FIG. 1A). For example, the isolator 20 may be an insulator configured for thermally insulating the element 12 from the heat source 14. As a non-limiting example, the insulator may be a ceramic shield that is configured for disrupting heat flow 26 (FIG. 1A) from the heat source 14 to the heat sink 16.

Referring again to FIGS. 1A and 1B, the isolator 20 may be translatable with respect to the heat source 14. That is, the isolator 20 may slide in a direction indicated by arrows 28 in FIGS. 1A and 1B in a plane perpendicular to the heat flow 26 within the heat engine 10 so as to block heat flow 26 to the element 12 when disposed in the first position 22. For example, the isolator 20 may be positionable between the element 12 and the heat source 14. Therefore, the isolator 20 may be suitably sized and shaped so as to be positioned and/or slide between the element 12 and the heat source 14.

In operation, e.g., during shut-down of the heat engine 10, the isolator 20 may translate into the first position 22 (FIG. 1A) between the element 12 and the heat source 14 so as to sufficiently block or isolate the element 12 from the heat source 14 so that the first shape memory alloy does not change crystallographic phase, as set forth in more detail below.

Likewise, during start-up and/or after a stall of the heat engine 10, exposing the element 12 to the source of thermal energy may include translating the isolator 20 away from the element 12 into the second position 24 (FIG. 1B) so that the isolator 20 is not disposed between the heat source 14 and the element 12 so as to expose the element 12 to the heat source 14. In this second position 24, at least partial heat flow 26 may exist between the heat source 14 and the element 12.

In another variation, although not shown, the element 12, rather than the isolator 20, may alternatively translate with respect to the heat source 14. That is, the isolator 20 may be fixed and the element 12 may be moveable. Therefore, exposing the element 12 to the source of thermal energy may include, for example, translating the heat engine 10 and/or the element 12 at least partially away from the isolator 20 and into the heat flow 26 during start-up and/or after a stall of the heat engine 10.

For this variation, during shut-down of the heat engine 10, the element 12 may be isolated from the heat source 14. For example, isolating the element 12 may include translating the heat engine 10 and/or the element 12 into the first position 22 (FIG. 1A) so as to block the element 12 from the heat source 14. That is, isolating may include sufficiently blocking the element 12 from the heat source 14, e.g., by translating the isolator 20, so that the first shape memory alloy does not change crystallographic phase.

Therefore, exposing the element 12 to the source of thermal energy may enhance heat flow 26 to the heat engine 10. For example, the isolator 20 may be configured as a lens or mirror to reflect, focus, or direct heat flow 26 to the heat engine 10 when the isolator 20 is disposed in the second position 24. Therefore, the isolator 20 may allow the temperature of the element 12 to increase. Such configurations may be useful for sources of thermal energy including infrared radiation or light, for example.

Figure 2A:
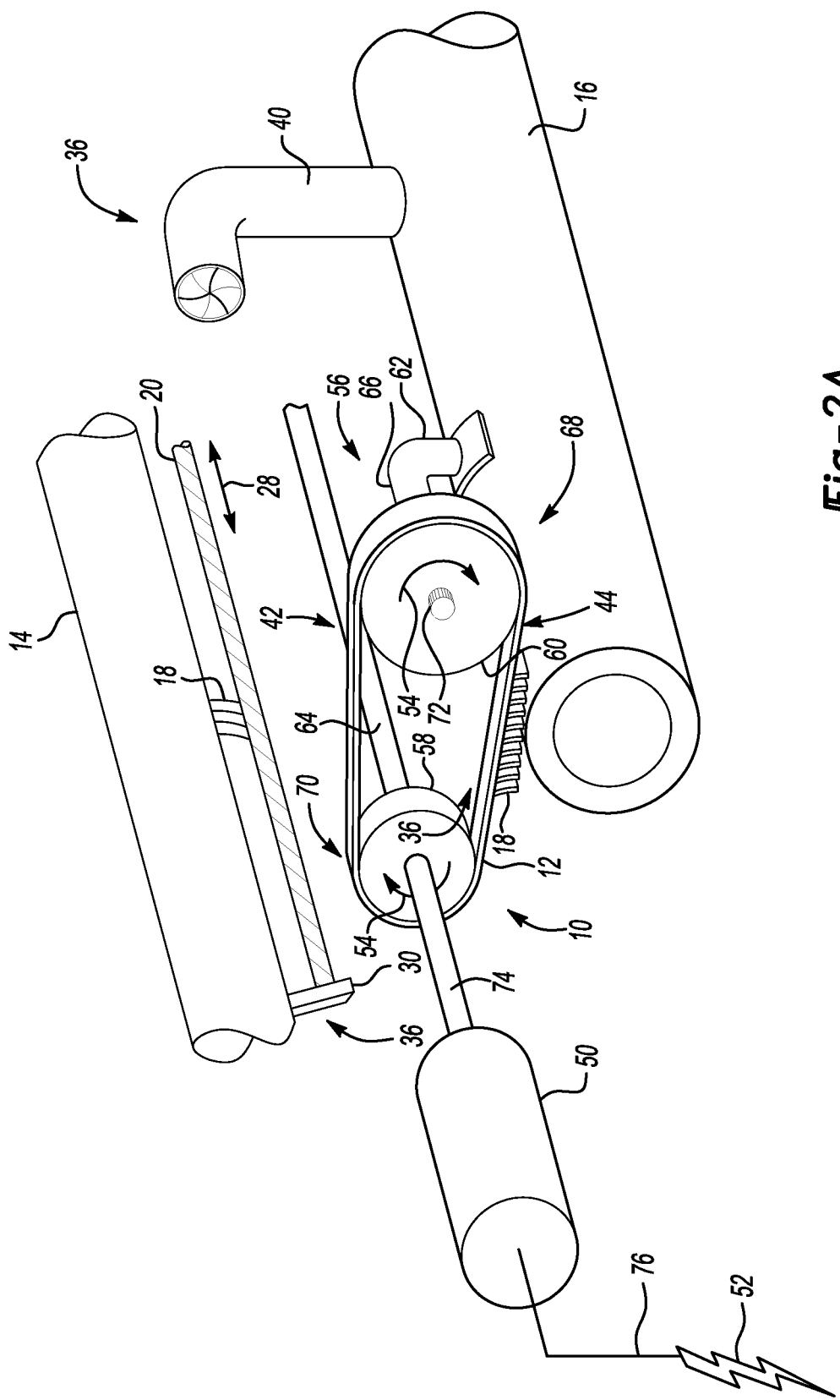
FIG. 2A is a schematic perspective view of the heat engine of FIGS. 1A and 1B, and a variation of the start-up mechanism of FIGS. 1A and 1B including a latch.
Figure 2B:
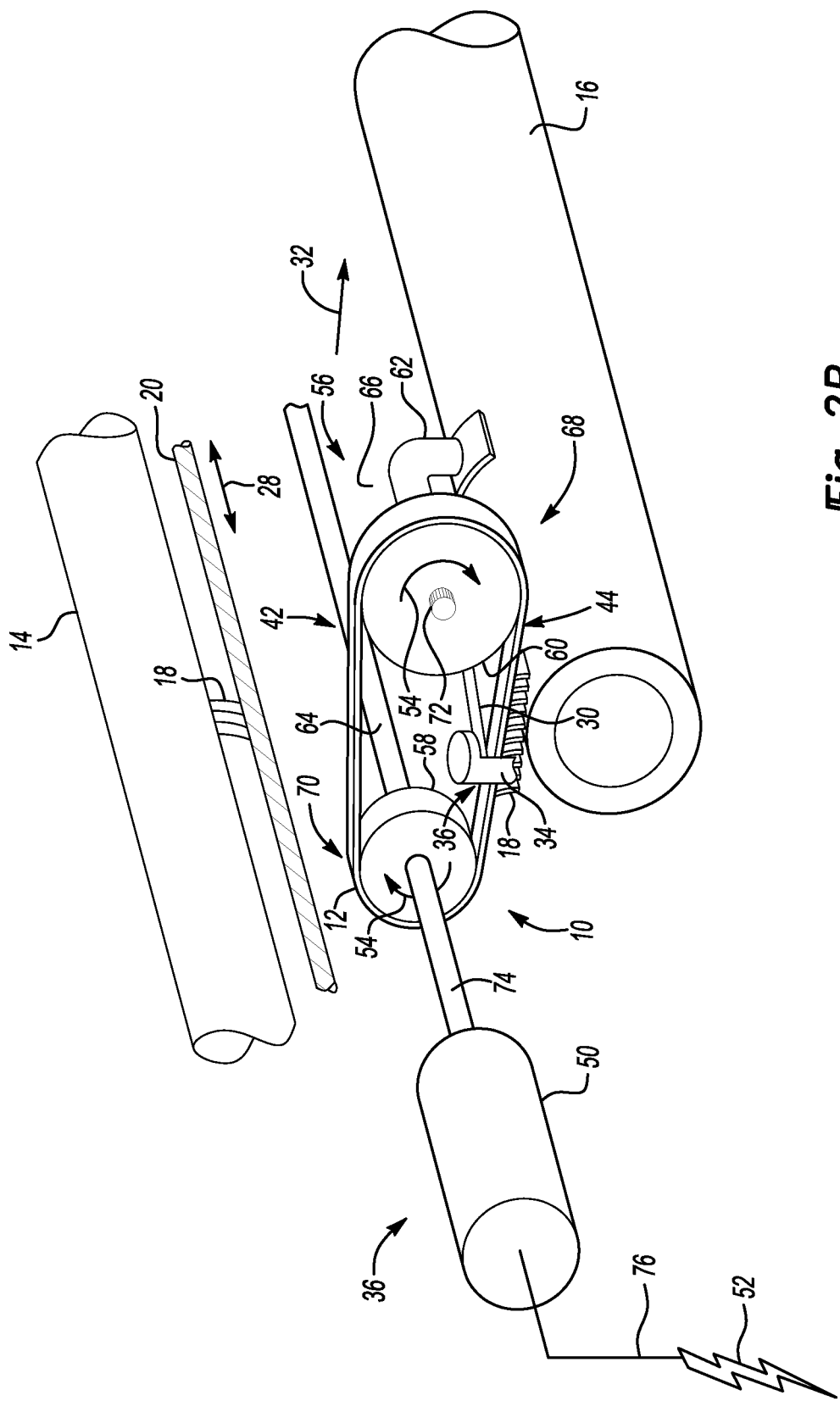
FIG. 2B is a schematic perspective view of the heat engine of FIGS. 1A and 1B, and another variation of the latch of FIG. 2A.

Referring again to the method of starting the heat engine 10 as described with respect to FIGS. 2A and 2B, alternatively or additionally, exposing the element 12 to the source of thermal energy may include unlatching a latch 30 configured for disposing the element 12 in insufficient thermal relationship with the heat source 14 for crystallographic phase change of the first shape memory alloy to occur. That is, the latch 30 may be configured for disposing the element 12 so that the first shape memory alloy may not change crystallographic phase. For example, the latch 30 may include a rotating arm (not shown) that may rotate to engage and disengage.

In one variation of the heat engine 10 shown in FIG. 2A, the latch 30 may retain the isolator 20 in the first position 22 (FIG. 1A) so that heat flow 26 (FIG. 1A) to the element 12 from the heat source 14 is disrupted. That is, when it is desired that the heat engine 10 is non-operational, i.e., shut down, the latch 30 may retain or otherwise position the isolator 20 so that the element 12 is without sufficient thermal relationship with either the heat source 14 or the heat sink 16 for crystallographic phase change to occur. For example, as shown in FIG. 2A, the latch 30 may be configured for positioning the isolator 20 between the heat source 14 and the heat sink 16 so as to block heat flow 26 (FIG. 1A) to the element 12. Conversely, when it is desired that the heat engine 10 is operational, e.g., during start-up of the heat engine 10, unlatching the latch 30 may release the isolator 20 so that the isolator 20 may translate in the direction of arrows 28 so as to dispose the element 12 in the second position 24 (FIG. 1B), i.e., in sufficient thermal relationship with the heat source 14 for crystallographic phase change to occur.

Therefore, as shown in FIG. 2A, for the method, exposing may include a combination of both unlatching the latch 30 and positioning the isolator 20, e.g., the insulator set forth above, in the second position 24 (FIG. 1B). That is, unlatching the latch 30 may position the isolator 20 in the second position 24 (FIG. 1B) and thereby dispose the element 12 in thermal relationship with the heat source 14, e.g., in contact with the plurality of contacting objects 18, so that the first shape memory alloy may change crystallographic phase. By way of a non-limiting example, the contacting objects 18 may be flexible bristles that may effect conduction between the heat source 14 and the element 12. In another example, the plurality of contacting objects 18 may be rollers configured to interface with the element 12. Although not shown, the plurality of contacting objects 18 may also extend from the element 12 so that the element 12 includes a plurality of flexible bristles.

Referring again to FIG. 2A, for the variation of the heat engine 10 including the plurality of heat-conducting contacting objects 18, latching the latch 30 may hold the element 12 apart from the contacting objects 18 so as to disrupt conduction. Conversely, when it is desired that the heat engine 10 is operational, the method may include unlatching or disengaging the latch 30. That is, unlatching the latch 30 may release or otherwise position the element 12 formed from the first shape memory alloy in thermal relationship with each of the heat source 14 and the heat sink 16, e.g., in conductive contact with the contacting objects 18, so that the first shape memory alloy may change crystallographic phase.

In another variation shown in FIG. 2B, latching the latch 30 may retain the element 12 in insufficient thermal relationship with the heat source 14 so as to prevent movement, e.g., translation, of the element 12. That is, latching the latch 30 may hold the element 12 in a desired position so that movement, e.g., alternating dimensional expansion and contraction, of the element 12 may not occur. Therefore, unlatching the latch 30 may allow the element 12 to move in a direction indicated by arrow 32 in FIG. 2B, i.e., perpendicular to the heat flow 26 (FIG. 1A) within the heat engine 10.

The latch 30 may also include a linkage 34 configured for urging the heat engine 10 in a desired operational direction when the latch 30 is disengaged or unlatched. That is, the linkage 34 may "kick-start" the heat engine 10 in the desired operational direction, e.g., clockwise. The linkage 34 may be any suitable device or system for urging the heat engine 10 in the desired operational direction. For example, the linkage 34 may include a cam, a rotating disc, a ramp, or combinations thereof. In one variation, the linkage 34 may move parallel to the desired operational direction of the heat engine 10 and may include an arm (not shown) that rotates to engage and disengage.

Exposing the element 12 to the source of thermal energy by unlatching the latch 30 may be useful for diesel engine exhaust system applications. In such applications, unlatching the latch 30 may dispose the element 12 in sufficient thermal relationship for heat flow 26 (FIG. 1A) to the element 12 from the heat source 14 and/or the heat sink 16 so that the first shape memory alloy may change crystallographic phase after the heat source 14, e.g., the diesel engine exhaust gas, reaches a desired first temperature, $T_1$. Therefore, exposing the element 12 to the source of thermal energy may include latching the latch 30 until the heat source 14 reaches the desired first temperature, $T_1$.

Referring again to FIGS. 2A-4, the method also includes changing the crystallographic phase of the first shape memory alloy to thereby convert thermal energy to mechanical energy. In operation, the first shape memory alloy that is pre-strained or subjected to tensile stress can change dimension upon changing crystallographic phase to thereby convert thermal energy to mechanical energy. That is, when exposed to the source of thermal energy, the element 12 formed from the first shape memory alloy changes dimension upon changing crystallographic phase to thereby convert thermal energy to mechanical energy, as set forth in more detail below.

In particular, changing the crystallographic phase from martensite to austenite may dimensionally contract the first shape memory alloy at a localized region (represented generally by 42 in FIG. 2A) in response to the heat source 14. More specifically, the first shape memory alloy may dimensionally contract if the first shape memory alloy has been previously pre-strained pseudoplastically. The terminology "pre-strained pseudoplastically" refers to stretching, e.g., straining, the element 12 under load while the first shape memory alloy is in the martensite phase. The shape of the first shape memory alloy under load may not fully recover when the element 12 is unloaded. In contrast, a shape of the element 12 when strained under purely elastic strain may fully recover. Therefore, upon unloading, the element 12 formed from the first shape memory alloy appears to have plastically deformed, but when the element 12 is heated to the austenite start temperature, $A_s$, the strained shape can be recovered so that the element 12 returns to an original length. That is, it is possible to load the first shape memory alloy such that an elastic strain limit of the first shape memory alloy is surpassed and deformation takes place in the martensitic crystal structure of the first shape memory alloy prior to exceeding a true plastic strain limit of the first shape memory alloy. Strain of this type, between the elastic strain limit and the true plastic strain limit, is pseudoplastic strain.

Therefore, the element 12 formed from the first shape memory alloy may be stretched before installation in the heat engine 10 such that the nominal length of the first shape memory alloy includes the recoverable pseudoplastic strain. Such recoverable pseudoplastic strain may provide motion for actuating and/or driving the heat engine 10. Therefore, without pre-stretching the first shape memory alloy, little deformation may occur during crystallographic phase change. Further, the element 12 may be subjected to a tensile force provided by a biasing mechanism, e.g., a spring or a tensioned austenitic section of the first shape memory alloy, to effect crystallographic phase change.

Conversely, for the method, changing the crystallographic phase from austenite to martensite may dimensionally expand the fist shape memory alloy at the localized region 42 in response to the heat sink 16. For example, when the first shape memory alloy is subjected to a tensile stress and the second temperature, $T_2$, the first shape memory alloy may dimensionally expand. The first shape memory alloy may thereby convert thermal energy to mechanical energy by alternately expanding and contracting. That is, the first shape memory alloy may alternately dimensionally contract at the localized region 42 in response to the heat source 14 and dimensionally expand at the localized region 42 in response to the heat sink 16 to thereby convert thermal energy to mechanical energy, as set forth in more detail below.

The first shape memory alloy may have any suitable composition. In particular, the first shape memory alloy may include in combination an element selected from the group of cobalt, nickel, titanium, indium, manganese, iron, palladium, zinc, copper, silver, gold, cadmium, tin, silicon, platinum, and gallium. For example, suitable first shape memory alloys may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The first shape memory alloy can be binary, ternary, or any higher order so long as the first shape memory alloy exhibits a shape memory effect, e.g., a change in shape orientation, damping capacity, and the like. The first shape memory alloy may be selected according to desired operating temperatures of the heat engine 10, as set forth in more detail below. In one specific example, the first shape memory alloy may include nickel and titanium.

Further, the element 12 formed from the first shape memory alloy may have any suitable form, i.e., shape. For example, the element 12 may have a form of a shape-changing element. That is, the element 12 may have a form selected from the group of springs, tapes, wires, bands, continuous loops, and combinations thereof. Referring to FIGS. 2A-4, in one variation, the element 12 may be configured as a continuous loop spring.

The first shape memory alloy may convert thermal energy to mechanical energy via any suitable manner. For example, the element 12 formed from the first shape memory alloy may activate a pulley system (shown generally in FIGS. 2A-4 and set forth in more detail below), engage a lever (not shown), rotate a flywheel (not shown), engage a screw (not shown), and the like.

For the method, changing the crystallographic phase may include operating the heat engine 10 in a desired operational direction, e.g., counterclockwise or leftward. That is, changing the crystallographic phase may cause the element 12 to move, e.g., translate, in one desired operational direction based on contraction of the element 12 when the first shape memory alloy is exposed to the heat source 14 and expansion of the element 12 when the first shape memory alloy is exposed to the heat sink 16.

Referring again to FIGS. 2A-4, the method also includes inducing initial movement of the element 12 in the desired operational direction to thereby start the heat engine 10. In particular, inducing may include activating a start-up mechanism 36 configured for kick-starting the heat engine 10. That is, under certain conditions, e.g., after a period of non-use or momentary stall of the heat engine 10, the start-up mechanism 36 may impart energy to the heat engine 10 to start the heat engine 10. Stated differently, inducing initial movement of the element 12 may kick-start the heat engine 10 in the desired operational direction. Therefore, the terminology "start-up" refers to any condition that follows non-operation of the heat engine 10. For example, start-up may occur after an extended period of non-use of the heat engine 10, or may occur after a momentary stall of the heat engine 10. The start-up mechanism 36 may therefore induce initial movement of the element 12 during a start or re-start of the heat engine 10. That is, especially when the heat engine 10 and/or element 12 has a symmetrical configuration, a "kick-start" may be required to ensure the heat engine 10 operates in the desired operational direction. Likewise, since the heat engine 10 and/or element 12 may be configured to operate in only one direction, as set forth in more detail below, the start-up mechanism 36 may aid in regulating the temperature of the shape memory alloy. That is, since a stall of the heat engine 10 may cause the element 12 formed from the shape memory alloy to overheat, the start-up mechanism 36 may ensure ongoing movement of the element 12 during a stall of the heat engine 10. Therefore, the initial movement of the element 12 may be temporary until the heat engine 10 is operational, i.e., until the heat engine 10 begins to convert thermal energy to mechanical energy. Non-limiting examples of the start-up mechanism 36 may include the isolator 20, the latch 30, and combinations thereof.

Figure 3:
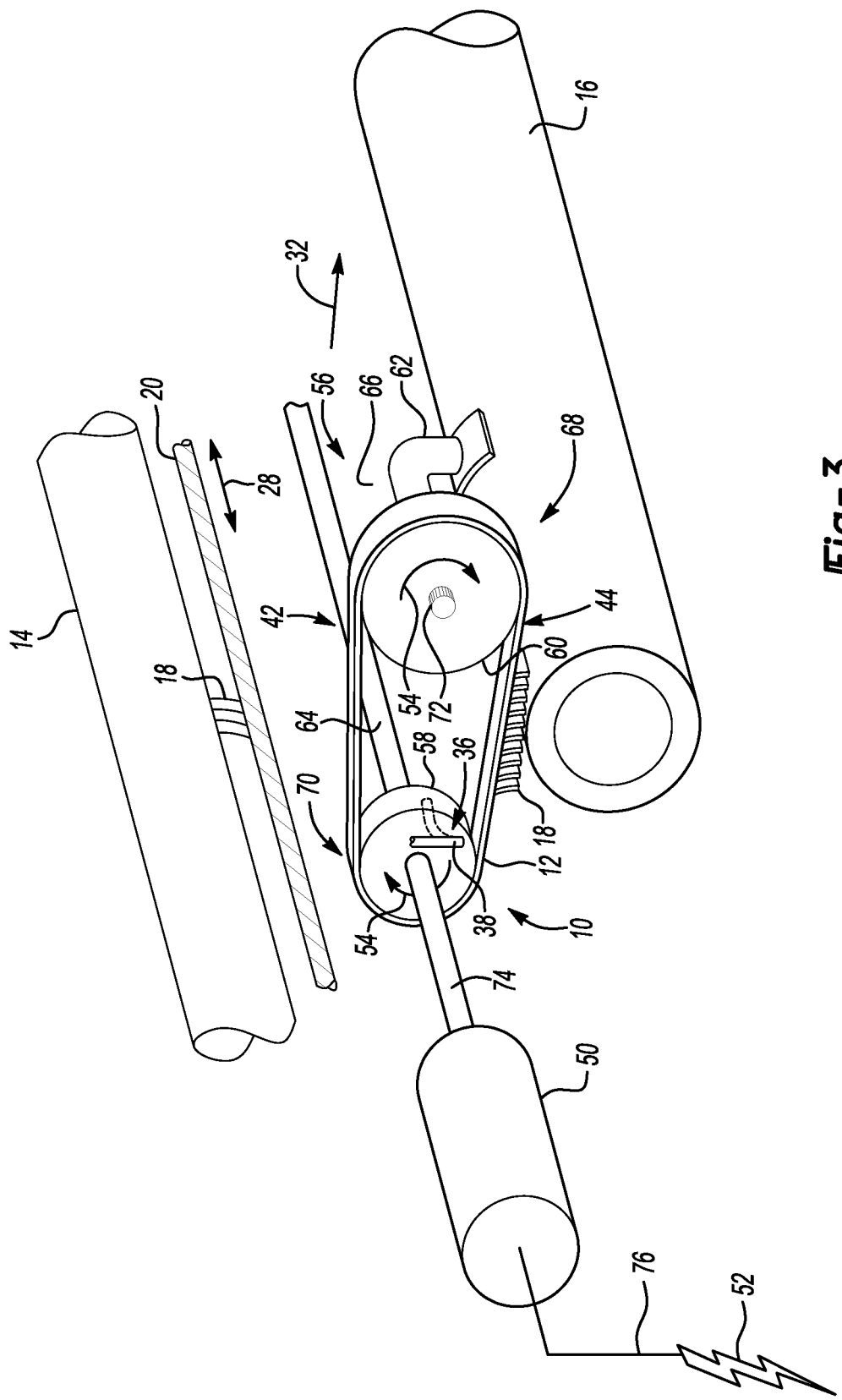
FIG. 3 is a schematic perspective view of the heat engine of FIGS. 1A and 1B, and yet another variation of the start-up mechanism of FIGS. 1A and 1B including a thermally-activated member.

Referring now to FIG. 3, in one variation, inducing initial movement of the element 12 may include thermally-activating a member 38 having a second transformation temperature, $T_{trans2}$, that is lower than the first transformation temperature, $T_{trans1}$. For example, the member 38 may be formed from a second shape memory alloy different from the first shape memory alloy set forth above. The second shape memory alloy may actuate at a different, e.g., lower, second transformation temperature, $T_{trans2}$, than the first shape memory alloy of the heat engine 10. Therefore, before the heat source 14 reaches the first temperature, $T_1$, the thermally-activated member 38 formed from the second shape memory alloy may impart initial motion to the heat engine 10 prior to the first shape memory alloy providing continuous operation of the heat engine 10.

Alternatively or additionally, the member 38 may be formed from a bimetal strip or a wax actuator. For example, the member 38 may deform, melt, and/or expand in response to the first temperature, $T_1$, and rub or urge the element 12 in a specified direction while deforming so as to kick-start the heat engine 10, i.e., induce initial movement of the element 12 in the desired operational direction to thereby start the heat engine 10. Therefore, the thermally-activated member 38 may be a further non-limiting example of the start-up mechanism 36 that may be activated to kick-start the heat engine 10.

Referring again to FIG. 2A, inducing initial movement of the element 12 may include directing fluid flow across the element 12 to thereby change a temperature of the element 12. For example, inducing initial movement may lower a temperature of the element 12. In one non-limiting variation, inducing initial movement of the element 12 may include directing fluid flow through an apparatus 40, such as air inlets or vanes, oriented so that air external to the heat engine 10 and/or relatively cooler exhaust gas may flow across the element 12 formed from the first shape memory alloy. Alternatively, the apparatus 40 may spray a cooled liquid onto the element 12. As the apparatus 40 lowers the temperature of the element 12, the element 12 may dimensionally expand and induce initial movement of the heat engine 10 in the desired operational direction. Therefore, heat flow 26 (FIG. 1A) may be increased to one area, e.g., the localized region represented by arrow 42 in FIG. 2A, as compared to another area, e.g., another localized region represented by arrow 44 in FIG. 2A, by the vent flaps or vanes.

Conversely, the apparatus 40 may increase a temperature of the element 12. For example, air external to the heat engine 10 and/or relatively warmer exhaust gas may flow across the element 12 formed from the first shape memory alloy. Alternatively, the apparatus 40 may spray a heated liquid onto the element 12. As the apparatus 40 increases the temperature of the element 12, the element 12 may dimensionally contract and induce motion of the heat engine 10 in the desired operational direction.

The apparatus 40 may alternatively or additionally direct fluid flow along the element 12 and thereby impart drag across the element 12, so as to cause motion of the element 20. That is, fluid directed by the apparatus 40 may induce drag across the element 12 and induce motion of the heat engine 10 in the desired operational direction. As such, the apparatus 40 may be a further non-limiting example of the start-up mechanism 36 that may be activated to kick-start the heat engine 10.

Figure 4:
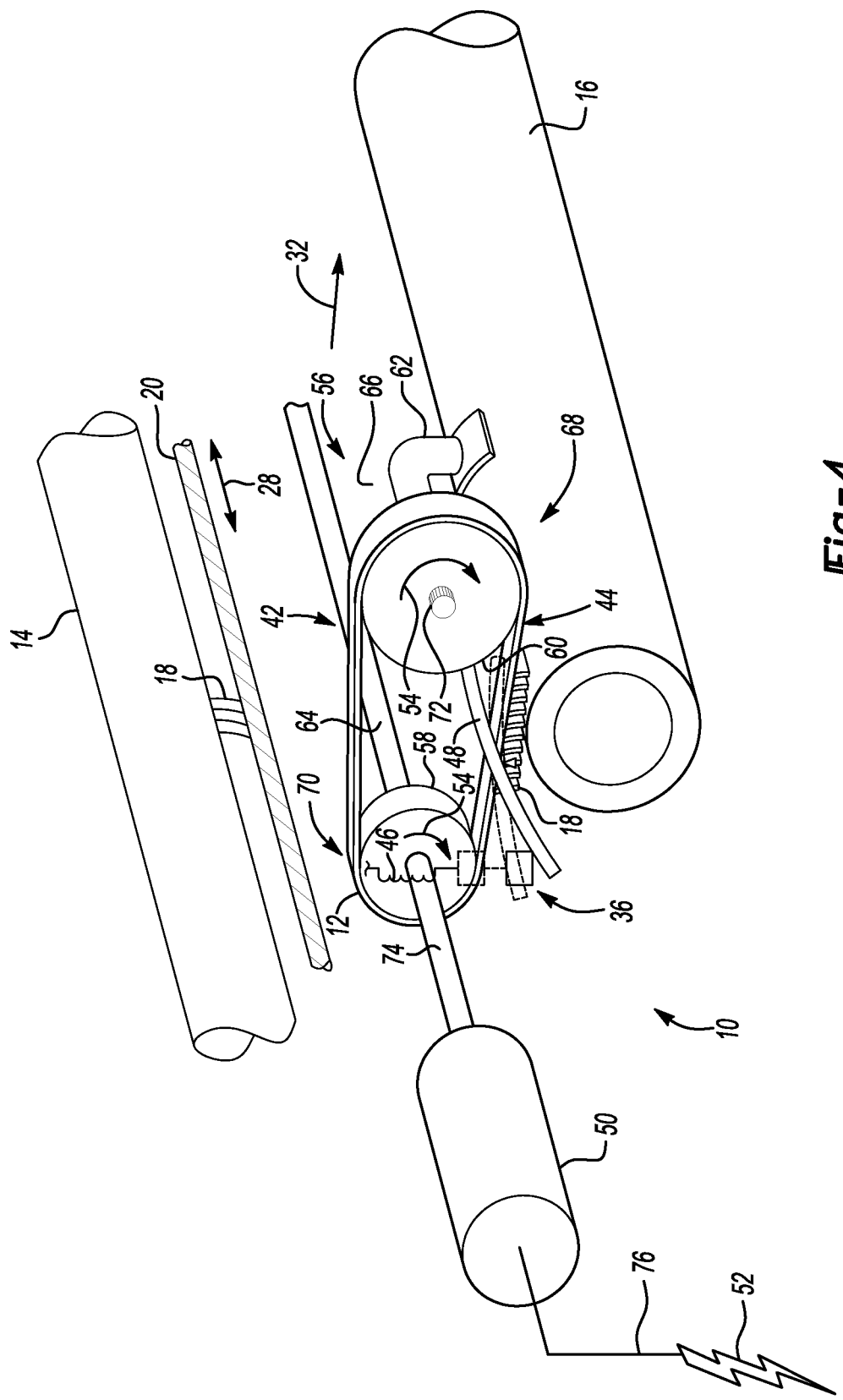
FIG. 4 is a schematic perspective view of the heat engine of FIGS. 1A and 1B, and a further variation of the start-up mechanism of FIGS. 1A and 1B including a potential energy source.

Referring now to FIG. 4, in another variation, inducing initial movement of the element 12 may include imparting kinetic energy to the heat engine 10. For example, inducing initial movement of the element 12 may include releasing potential energy to thereby impart kinetic energy to the heat engine 10. In one non-limiting example, releasing potential energy may include triggering a potential energy source 46, such as a spring or a suspended mass, to release potential energy and impart an initial, controlled kinetic energy to the heat engine 10. As a non-limiting example, releasing potential energy may release the spring or suspended mass to act on a lever 48 and nudge the element 12 or pulley 60 in the desired operational direction. Therefore, the potential energy source 46 may be another non-limiting example of the start-up mechanism 24 that may kick-start the heat engine 10.

Alternatively or additionally, inducing initial movement of the element 12 may include imparting kinetic energy, such as, but not limited to, vibrational energy, to the element 12. For example, for automotive applications, vibration from a vehicle engine (not shown) or braking system (not shown) may impart kinetic energy to the element 12. That is, the heat engine 10 may be releasably connected to rigid structural members (not shown) of the vehicle, and kinetic energy may be imparted to the heat engine 10 by exposing the heat engine 10 to vehicle vibrations. After the heat engine 10 is vibrated or shaken sufficiently to induce initial movement of the element 12, the heat engine 10 may be isolated or disconnected from the rigid structural members (not shown) of the vehicle. For example, the isolator 20 may also be configured to isolate the element 12 from the source of vibrational energy. Therefore, vibration may be used to initially urge the element 12 or pulley 60 in the desired operational direction.

In another variation, kinetic energy may be imparted to the element 12 by driving a generator 50 (FIGS. 2A-4) in reverse so that the generator 50 acts as a motor, as set forth in more detail below. Therefore, a source of kinetic energy, e.g., vibrational energy, may be another non-limiting example of the start-up mechanism 36 configured for kick-starting the heat engine 10.

Further, it is to be appreciated that inducing initial movement to the element 12 may expose the heat engine 10 to multiple energy sources. For example, during non-standard operation, i.e., operation of a damaged heat engine 10 and/or operation during out-of-design conditions, the heat engine 10 may react to a vibrational energy source and a potential energy source 46. Further, inducing initial movement to the element 12 may expose the heat engine 10 to energy sources in series or in parallel configuration. The heat engine 10 may be exposed to the energy sources for varying temporary durations. Moreover, the start-up mechanism 36 may be configured to interact with any component of the heat engine 10. That is, the start-up mechanism 36 may contact or engage the element 12, and/or may contact or engage other structures of the heat engine 10, such as pulleys 58, 60, as set forth in more detail below.

With continued reference to FIG. 2A, the method may further include converting mechanical energy to electricity (represented generally by 52 in FIG. 2A). For example, the heat engine 10 may convert mechanical energy to electricity 52 by driving the generator 50. The generator 50 may be any suitable device for converting mechanical energy to electricity 52. For example, the generator 50 may be an electrical generator that converts mechanical energy to electricity 52 using electromagnetic induction, and may include a rotor (not shown) that rotates with respect to a stator (not shown).

Referring again to FIG. 2A, converting mechanical energy to electricity 52 may include driving the generator 50 with the heat engine 10. That is, mechanical energy resulting from the conversion of thermal energy by the element 12 formed from the first shape memory alloy may drive the generator 50. In particular, converting mechanical energy to electricity 52 may include driving the generator 50 with the aforementioned dimensional contraction and expansion of the first shape memory alloy. That is, the first shape memory alloy may dimensionally contract at the localized region 42 in response to the heat source 14 and dimensionally expand at the localized region 42 in response to the heat sink 16 to thereby drive the generator 50 and convert thermal energy to electricity 52.

Further, for the method, inducing initial movement of the element 12 may include converting electricity 52 to kinetic energy. For example, the generator 50 may drive the heat engine 10 during start-up so as to induce initial movement to the element 12. That is, the generator 50 may be operated in reverse as a motor to convert electricity 52, e.g., from a battery, to kinetic energy to thereby temporarily drive the heat engine 10. Therefore, the generator 50 may be another non-limiting example of the start-up mechanism 36 that may kick-start the heat engine 10.

Referring again to FIG. 2A, inducing initial movement of the element 12 may include preventing operation of the heat engine 10 in a non-desired operational direction. That is, for the method, inducing may include only moving the element 12 in the desired operational direction. For example, as shown in FIG. 2A, a clutch (represented generally by arrows 54) may prevent operation of the heat engine 10 in the non-desired operational direction. The clutch 54 may be configured to include a ratcheting mechanism to allow the heat engine 10 to operate in only the desired operational direction. The clutch 54 may therefore be characterized as "one-way" and may ensure that the heat engine 10 is not "back driven".

For the method, inducing initial movement of the element 12 may include operating the heat engine 10 asymmetrically. For example, as described with reference to FIG. 2A, in one non-limiting example, the element 12 may be configured in a continuous loop (shown generally at 56 in FIG. 2A). In this example, the heat engine 10 may include a plurality of pulleys 58, 60 or wheels configured for supporting the element 12. The heat engine 10 may also include a frame 62 configured for supporting the plurality of pulleys 58, 60 or wheels. For example, the plurality of pulleys 58, 60 or wheels may be disposed on a plurality of axles 64, 66, and may rotate with respect to the frame 62. The element 12 formed from the first shape memory alloy may be supported by, and travel along the wheels or pulleys 58, 60. That is, in this variation, operating the heat engine 10 asymmetrically may include translating the element 12 configured as the continuous loop 56 along the plurality of pulleys 58, 60 configured for supporting the element 12.

As shown in FIGS. 2A-4, a first portion 68 of the continuous loop 56 may be longer than a second portion 70 of the continuous loop 56 whereby the heat engine 10 has an asymmetrical configuration. Therefore, initial movement of the element 12 may be induced by operating the heat engine 10 asymmetrically so that a change in length of the element 12 resulting from dimensional expansion of the first portion 68 may not be equal to a change in length of the element 12 resulting from dimensional contraction of the second portion 70.

With continued reference to FIGS. 2A-4, speed of rotation of the wheels or pulleys 58, 60 may optionally be modified by one or more gear sets 72. Moreover, the generator 50 may include a drive shaft 74 attached to the wheel or pulley 58. As the wheels or pulleys 58, 60 turn or rotate about the respective axles 64, 66 of the heat engine 10 in response to the dimensionally expanding and contracting element 12 formed from the first shape memory alloy, the drive shaft 74 may rotate and drive the generator 50. The generator 50 may then generate electricity 52 so that mechanical energy is converted to electricity 52.

Conversely, as set forth above, the method may include converting electricity 52 to kinetic energy by, for example, driving the heat engine 10 with the generator 50 during start-up of the heat engine 10. That is, the generator 50 may be operated as a motor, as set forth above, and may drive the drive shaft 74 attached to the wheel or pulley 58. The motor may rotate one or more of the wheels or pulleys 58, 60 (FIG. 2A) so as to provide initial operation of the heat engine 10 in the desired operational direction. As the pulley 58 turns, the element 12 configured as the continuous loop 56 translates along the plurality of pulleys 58, 60 and thereby starts the heat engine 10. Therefore, in this example, the start-up mechanism 36, i.e., the asymmetrical configuration of the heat engine 10, is configured for inducing initial movement of the element 12 in the desired operational direction to thereby translate the element 12 along the plurality of pulleys 58, 60 and start the heat engine 10.

As set forth above, for this variation, the start-up mechanism 36 may further include the clutch 54 configured for preventing operation of the heat engine 10 in the non-desired operational direction. That is, one or more pulleys 58, 60 may include a one-way clutch 54 to prevent rotation in the non-desired operational direction. Therefore, the continuous loop 56 may translate along the plurality of pulleys 58, 60 in only the desired operational direction. Alternatively or additionally, vibration may be used to rotate one or more of the wheels or pulleys 58, 60 so as to kick-start the heat engine 10.

For the method, and described with continued reference to FIG. 2A, the heat engine 10, and in particular, the element 12 formed from the first shape memory alloy, may be disposed in thermal relationship with each of the heat source 14 and the heat sink 16, as set forth above. That is, the element 12 may be disposed relative to each of the heat source 14 and the heat sink 16 so as to react to the first temperature, $T_1$, and/or the second temperature, $T_2$. For example, the element 12 of the heat engine 10 may be disposed in contact with the plurality of contacting objects 18 of the heat source 14 and the heat sink 16 so as to effect crystallographic phase change of the first shape memory alloy via conduction. Alternatively, the element 12 may be disposed in sufficient thermal relationship with a radiative coating on the heat source 14 and/or heat sink 16 so as to effect crystallographic phase change of the first shape memory alloy via radiation.

Therefore, the first shape memory alloy may change crystallographic phase between austenite and martensite when in thermal relationship with one of the heat source 14 and the heat sink 16. For example, when in thermal relationship with the heat source 14, the first shape memory alloy may change from martensite to austenite. Likewise, when in thermal relationship with the heat sink 16, the first shape memory alloy may change from austenite to martensite.

Further, the first shape memory alloy may change dimension upon changing crystallographic phase to thereby convert thermal energy to mechanical energy. More specifically, the first shape memory alloy may dimensionally contract upon changing crystallographic phase from martensite, e.g., if pseudoplastically pre-strained, to austenite and may dimensionally expand upon changing crystallographic phase from austenite to martensite to thereby convert thermal energy to mechanical energy. Therefore, for any condition wherein the temperature difference exists between the first temperature, $T_1$, of the heat source 14 and the second temperature, $T_2$, of the heat sink 16, i.e., wherein the heat source 14 and the heat sink 16 are not in thermal equilibrium, the first shape memory alloy may dimensionally expand and contract upon changing crystallographic phase between martensite and austenite. Also, the change in crystallographic phase of the first shape memory alloy is sufficient to drive the generator 50.

With reference to the heat engine 10 of FIG. 1 and described with respect to the example configuration of the element 12 shown in FIG. 2A, during start-up and continuous operation of the heat engine 10, one wheel or pulley 58 is in thermal relationship with, e.g., immersed or in contact with, the heat source 14 while another wheel or pulley 60 is in thermal relationship with the heat sink 16 so as to effect crystallographic phase change of the first shape memory alloy. Therefore, for the method, inducing initial movement of the element 12 may be simultaneous with each of exposing the element 12 of the heat engine 10 to the heat source 14 and changing the crystallographic phase of the first shape memory alloy. Alternatively, there may be a delay between exposing the element 12 to the source of thermal energy and inducing initial movement of the element 12, wherein the crystallographic phase of the first shape memory alloy changes thereafter.

As the localized region (generally indicated by arrow 44) of the first shape memory alloy dimensionally expands, e.g., dimensionally stretches when under stress, when in thermal relationship with the heat sink 16, the other localized region (generally indicated by arrow 42) of the first shape memory alloy in thermal relationship with the heat source 14 dimensionally contracts when previously pseudoplastically pre-strained. That is, the first shape memory alloy may alternately dimensionally contract at the localized region 42 in response to the heat source 14 and dimensionally expand at another localized region 44 in response to the heat sink 16 to thereby convert thermal energy to mechanical energy. Alternating dimensional contraction and expansion of the continuous spring loop form of the element 12 upon exposure to the temperature difference, ΔT, between the heat source 14 and the heat sink 16 may convert potential mechanical energy to kinetic mechanical energy, and thereby convert thermal energy to mechanical energy. Therefore, for optimal efficiency of the heat engine 10, the heat source 14 and the heat sink 16 are desirably rapidly refreshed to maintain the temperature difference, ΔT, between the heat source 14 and heat sink 16.

Referring again to FIG. 1, the heat engine 10 may be disposed in any arrangement as long as portions of the element 12 are disposed in sufficient thermal relationship with a respective heat source 14 and heat sink 16 during operation so that the first shape memory alloy may change crystallographic phase in response to at least one of the heat source 14, the heat sink 16, and the temperature difference, ΔT, between the heat source 14 and the heat sink 16. Also, although not shown, it is to be appreciated that the heat engine 10 may include additional sensing and control components, e.g., an electronic control unit. The electronic control unit may be in operable communication with the heat engine 10 and be configured for regulating conversion of thermal energy to mechanical energy and/or electricity 52 (FIG. 2A). The electronic control unit may be, for example, a computer that electronically communicates with one or more controls and/or sensors of the heat engine 10. For example, the electronic control unit may communicate with and/or control one or more of a temperature sensor of the heat source 14, a temperature sensor of the heat sink 16, a speed regulator of the generator 50, fluid flow sensors, actuators, and meters configured for monitoring electricity generation.

Further, as shown in FIGS. 2A-4, the heat engine 10 may also include a transfer medium 76 configured for conveying electricity 52 from the heat engine 10, e.g., from the generator 50. The transfer medium 76 may be, for example, a power line or an electrically-conductive cable. The transfer medium 76 may convey electricity 52 from the generator 50 to a storage device, e.g., a battery (not shown), an accumulator, and/or a collector. For example, the heat engine 10 may generate, store, and/or convey electricity 52 according to fluctuations in demand.

It is also to be appreciated that for any of the aforementioned examples, variations, or configurations, the heat engine 10 may include a plurality of elements 12 and/or a plurality of generators 50. That is, one heat engine 10 may include more than one element 12 and/or generator 50. For example, one heat engine 10 may drive more than one generator 50.

In one non-limiting variation, the method includes exposing the element 12 of the heat engine 10 to the source of thermal energy, wherein exposing includes positioning the isolator 20 configured for blocking the element 12 from the heat source 14 from the first position 22 (FIG. 1A) to the second position 24 (FIG. 1B). The isolator 20 is disposed between the element 12 and the heat source 14 in the first position 22 (FIG. 1A) and is not disposed between the element 12 and the heat source 14 in the second position 24 (FIG. 1B).

For this variation, the method also includes alternately changing the crystallographic phase of the first shape memory alloy from martensite to austenite to thereby dimensionally contract the first shape memory alloy at the localized region 42 in response to the heat source, and from austenite to martensite to thereby dimensionally expand the first shape memory alloy at the localized region 42 in response to the heat sink so as to convert thermal energy to mechanical energy. That is, the crystallographic phase may repeatedly change from martensite to austenite, and back to martensite, so as to alternately dimensionally contract and expand a portion 68, 70 of the element 12.

In this variation, the method also includes inducing initial movement of the element 12 in the desired operational direction by activating the start-up mechanism 36 configured for kick-starting the heat engine 10 to thereby start the heat engine 10. Referring again to FIG. 2A-4, the start-up mechanism 36 may include the latch 30, potential energy source 46, the member 38, the apparatus 40, the generator 50, the clutch 54, the linkage 34, an asymmetrical configuration of the heat engine 10, and combinations thereof. For this variation, inducing may include preventing operation of the heat engine 10 in the non-desired operational direction as set forth above. For example, the clutch 54 may prevent the heat engine 10 from operating in reverse.

In another non-limiting variation, the method includes exposing the element 12 to the source of thermal energy, changing the crystallographic phase of the first shape memory alloy, and inducing initial movement of the element 12, as set forth above. For this variation, the method also includes positioning the element 12 in insufficient thermal relationship with the heat source 14 for crystallographic phase change of the first shape memory alloy so as to cease movement of the element 12 in the desired operational direction and thereby disable the heat engine 10.

For example, referring to FIG. 1A, positioning may include isolating the element 12 from the heat source 14 by positioning the isolator 20 between the element 12 and the heat source 14. The isolator 20 may block heat flow 26 to the element 12 and position the element 12 in insufficient thermal relationship with the heat source 14 for any crystallographic phase change to occur. Therefore, the first shape memory alloy may cease dimensionally expanding and/or contracting. That is, isolating the element 12 from the heat source 14 may cease movement of the element 12 in the desired operational direction so that the heat engine 10 is disabled. As such, the method may include shutting down the heat engine 10.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of starting a heat engine, the method comprising:
exposing an element of the heat engine to a source of thermal energy provided by a temperature difference between a heat source having a first temperature and a heat sink having a second temperature that is lower than the first temperature, wherein the element is configured as a continuous loop and is formed from a first shape memory alloy having a crystallographic phase changeable between austenite and martensite at a first transformation temperature in response to the temperature difference between the heat source and the heat sink;
wherein exposing includes positioning an isolator configured for blocking the element from the heat source from a first position to a second position;
wherein the isolator is disposed between the element and the heat source in the first position, and
wherein the isolator is not disposed between the element and the heat source in the second position;
alternately changing the crystallographic phase of the first shape memory alloy from martensite to austenite to thereby dimensionally contract the first shape memory alloy at a localized region in response to the heat source, and from austenite to martensite to thereby dimensionally expand the first shape memory alloy at the localized region in response to the heat sink so as to convert thermal energy to mechanical energy; and
inducing initial movement of the element in a desired operational direction directing fluid flow across the element to change a temperature of the element and thereby start the heat engine.

2. The method of claim 1, wherein the inducing further includes preventing operation of the heat engine in a non-desired operational direction.

3. The method of claim 1, wherein the inducing further includes thermally-activating a member having a second transformation temperature that is lower than the first transformation temperature.

4. The method of claim 1, wherein the inducing further includes imparting kinetic energy to the heat engine.

5. The method of claim 1, wherein the inducing further includes converting electricity to kinetic energy.

6. The method of claim 1, wherein the inducing further includes operating the heat engine asymmetrically.

7. The method of claim 6, wherein the operating further includes translating the element configured as a continuous loop along a plurality of pulleys configured for supporting the element.

8. The method of claim 1, wherein the exposing further includes unlatching a latch configured for disposing the element in insufficient thermal relationship with the heat source for crystallographic phase change of the first shape memory alloy to occur.

9. A method of starting a heat engine, the method comprising:
exposing an element of the heat engine to a source of thermal energy provided by a temperature difference between a heat source having a first temperature and a heat sink having a second temperature that is lower than the first temperature, wherein the element is formed from a first shape memory alloy having a crystallographic phase changeable between austenite and martensite at a first transformation temperature in response to the temperature difference between the heat source and the heat sink; changing the crystallographic phase of the first shape memory alloy to thereby convert thermal energy to mechanical energy;
inducing initial movement of the element in a desired operational direction by directing fluid flow across the element to change a temperature of the element and thereby start the heat engine; and
positioning the element in insufficient thermal relationship with the heat source for crystallographic phase change of the first shape memory alloy to occur so as to cease movement of the element in the desired operational direction and thereby disable the heat engine.

10. The method of claim 9, wherein the positioning further includes isolating the element from the heat source by disposing an isolator between the element and the heat source.

* * * * *